United States Patent
Sender et al.

(10) Patent No.: US 6,908,192 B2
(45) Date of Patent: Jun. 21, 2005

(54) APPARATUS AND METHOD FOR PRINTING AND LAMINATING MEDIA

(75) Inventors: Jordi Sender, Barcelona (ES); Roman Barba, Terrassa Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/629,413

(22) Filed: Jul. 29, 2003

(65) Prior Publication Data

US 2005/0022936 A1 Feb. 3, 2005

(51) Int. Cl.$^7$ ................................................ B41J 2/01
(52) U.S. Cl. .................. 347/105; 347/102; 400/120.01
(58) Field of Search ............................ 347/2, 101, 102, 347/105, 174–178; 400/120.01, 120.02, 120.03, 120.04, 614, 614.1; 156/384, 387, 277, 361, 363, 364

(56) References Cited

U.S. PATENT DOCUMENTS 6,585,366 B2 * 7/2003 Nagata et al. ............... 347/101
6,641,314 B2 * 11/2003 Mogi ..................... 400/120.01

* cited by examiner

*Primary Examiner*—Stephen D. Meier
*Assistant Examiner*—Ly T. Tran

(57) ABSTRACT

A printing apparatus comprises a printing device and a laminating device that work in an integrated operation, such that in normal operation the print media extends between the printing device and the laminating device; the printing device comprises means for printing at least one plot on said media while it advances in a first media advance direction, and the laminating device comprises means for laminating at least one printed plot in a second advance direction of said print media which is opposite to said first advance direction. The laminating device may comprise means for selectively inactivating lamination when print media travels therethrough.

Figure 1:
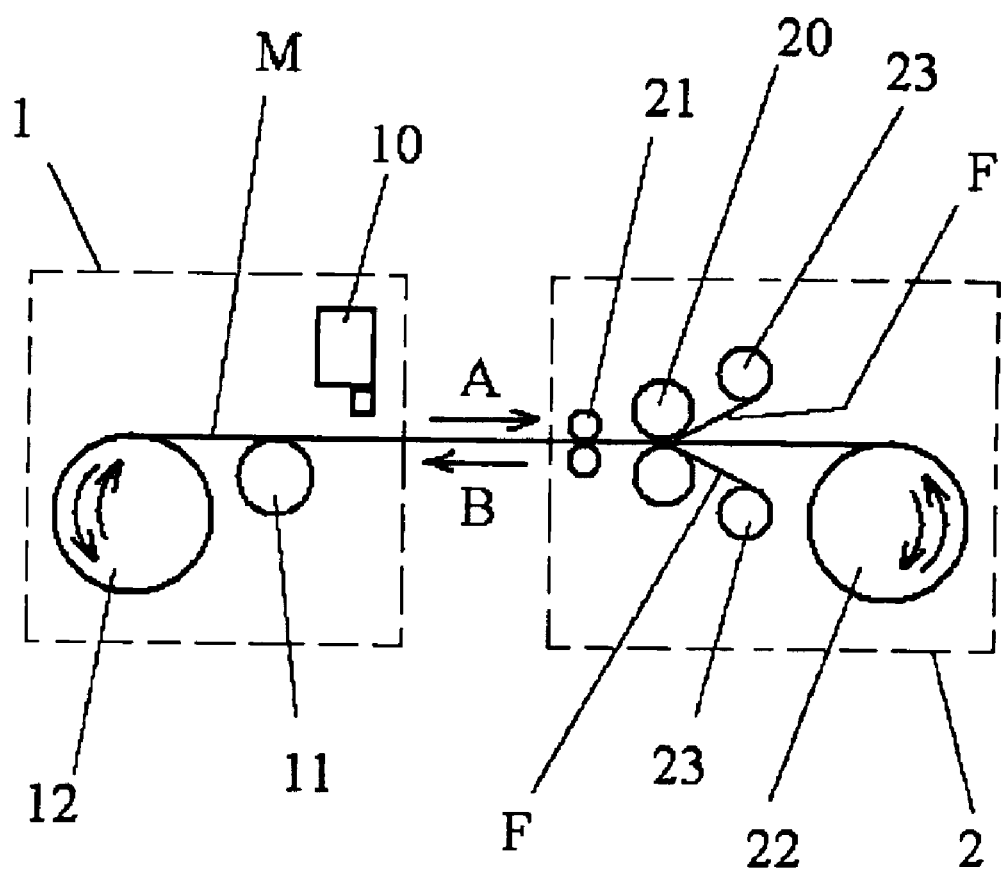

A method for printing and laminating at least part of a print media in an integrated operation is such that printing of at least one plot is performed in a first advance direction of said print media and subsequent laminating of at least one printed plot is performed in a second advance direction of said print media, opposite to said first advance direction.

12 Claims, 2 Drawing Sheets

APPARATUS AND METHOD FOR PRINTING AND LAMINATING MEDIA

The present invention relates to an apparatus which comprises a printing device and a Laminating device, and to a method for printing and laminating media.

Known in the state of the art are laminating apparatus which allow lamination or plastification of a picture or other plot, i.e. cover it with at least one layer of a protective film which is generally a transparent plastic film.

In order to laminate a plot printed in a printing apparatus, prior art devices required the user to wait until the end of the printing operation, manually take the printed plot from the printer to a standalone laminator, and carefully introduce the plot into the latter.

This method has the drawback of requiring user intervention between the printing and the laminating operations, especially in the case of professional use of the devices when it is also costly.

Also known, e.g. from U.S. Pat. No. 6,264,296, is a small format ID card printer which includes a laminating station; each ID card is printed and dried and then fed to the laminating station.

It would be desirable to have a more versatile apparatus, e.g. an apparatus which can be used for printing and laminating plots of different sizes, and this in unattended manner.

In particular, it would be desirable to be able to perform in-line lamination for different lengths of plot especially in large format printing apparatus, such as inkjet plotters.

In this kind of apparatus, handling of the media is in itself complicated due to its size and behaviour, and inline lamination adds to the problems to be solved; furthermore, since these printers are generally for professional use, it is desirable to provide enhanced versatility and unattended operation as far as possible.

On the other hand, it would be desirable to have an apparatus in which these advantages can be achieved using different printing and laminating techniques, including for example hot Lamination.

It has to be noted that several problem need to be solved when attempting to integrate a printer and a laminator and to perform in-line printing and lamination, especially with large format apparatus and plots.

For example, the speed of the printing operation may vary a lot depending on the type of plot and is generally stepwise, while lamination may require completely different speeds, and preferably a constant speed.

Further difficulties of the integration result from balancing the advantage of proving a back tension on the media during lamination, in order to minimize skew and media cockle, with the need to avoid undesired tension on the media being printed.

According to a first aspect, the present invention relates to a printing apparatus comprising a printing device for printing on print media and a laminating device for laminating at least part of said print media in an integrated operation, such that in normal operation the print media extends between the printing device and the laminating device, wherein said printing device comprises means for printing at least one plot on said media while it advances in a first media advance direction, and said laminating device comprises means for laminating at least one printed plot in a second advance direction of said print media which is opposite to said first advance direction.

These features allow to separate in time the operation of printing a plot from the operation of laminating the printed plot, and may thus allow to print and laminate a print media in unattended manner without the limitations imposed by the integration of the two processes: for example, it may allow to laminate always in the same conditions, not dependent or synchronised with the printing speed.

In embodiments of the invention, said laminating device comprises means for selectively inactivating lamination when print media travels therethrough.

The apparatus may comprise a first media supporting roller arranged upstream of the printing device in said first media advance direction and first roller driving means for taking up media on said first media supporting roller, said first roller driving means being releasable such as to allow media to be fed from said first media supporting roller.

This first roller allows to feed media to the printing device when the media travels in the first advance direction, and also to take up media when it travels in the opposite direction.

In embodiments of the invention, said first media supporting roller may be a media feed roller of said printing device.

The apparatus may also comprise a second media supporting roller arranged downstream of the laminating device in said first media advance direction and second roller driving means for taking up media on said second media supporting roller, said second roller driving means being releasable such as to allow media to be fed from said second media supporting roller.

This second roller allows to feed the media when it travels in the second advance direction and to take it up when it travels in the first advance direction.

Since the media is wound on this roller after being printed and before being laminated, media cockle caused by the printing operation is reduced and the quality of lamination may be improved.

In some embodiments, said second media supporting roller comprises braking means for tensioning the media being fed from said second media supporting roller.

Such tensioning helps to avoid media skew and thus to improve the laminating operation.

The second media supporting roller may be associated to said laminating device.

In a second aspect, the present invention relates to a printing device comprising a feed roller for feeding a print media, driving means for drawing print media from said feed roller in a first media advance direction, and roller driving means for rewinding and taking up media on said feed roller in a second media advance direction which is opposite to said first advance direction.

In a third aspect, the present invention relates to a Laminating device comprising a media path, a Laminating nip arranged along said media path for laminating a media, a pair of drive rolers arranged in said media path for driving the media being laminated, and a motorised media supporting roller arranged at one end of said media path for holding media, wherein said laminating nip is arranged along said media path between said pair of drive rollers and said motorised media supporting roller.

According to a further aspect, the invention relates to a method for printing and laminating at least part of a print media in an integrated operation, such that in normal operation the print media extends between a printing device and a laminating device, wherein printing of at least one plot is performed in a first advance direction of said print media and subsequent laminating of at least one printed plot is performed in a second advance direction of said print media, which is opposite to said first advance direction.

In some embodiments, this method comprises the steps of:

advancing print media through said printing device in said first advance direction while printing at least one plot on said print media;

further advancing the print media in said first advance direction until said at least one plot travels past said laminating device, white maintaining said laminating device inactive; and reversing the media advance direction and rewind the media towards the printing device in said second advance direction opposite to said first advance direction, while laminating at least one printed plot in said laminating device.

The method may also comprise the further step of advancing the print media in said first advance direction at least until all the laminated media has travelled past the printing device, while maintaining the laminating device inactive.

According to a still further aspect, a method for printing and laminating at least part of a print media according to the invention comprises the steps of:

advancing print media through a printing device in a first advance direction, and printing at least one plot on said print media;

advancing the print media leaving the printer through a laminating device in said first advance direction, until said at least one plot travels past the laminating device, while maintaining said laminating device inactive;

reversing the media advance direction and rewind the media towards the printing device in a second advance direction opposite to said first advance direction, while laminating at least one printed plot in said laminating device; and reversing again the media advance direction to advance laminated media in said first advance direction through the printing and laminating devices until all the laminated media has travelled past the printing device, while maintaining the laminating device inactive.

Another aspect of the present invention deals with a method for printing and laminating at least part d a web of print media, comprising the steps of:

advancing the web of print media through a printing device and a laminating device in a first advance direction, while printing on said print media and maintaining said laminating device inactive, until substantially all the web has travelled past the laminating device;

reversing the media advance direction and rewind the web of media towards the printing device in a second advance direction opposite to said first advance direction, while laminating at least part of said web of media in said laminating device, until substantially all the web of media has travelled back past the printing device.

This method allows to print and laminate a whole web of media without the need of manual intervention for changing the web of media from one apparatus to another or from one supporting roller to another.

Particular embodiments of the present invention will be described in the following, only by way of non limiting example, with reference to the appended drawings, in which:

FIG. 1 shows the basic elements of an apparatus according to an embodiment of the present invention; and FIGS. 2 to 5 are diagrams showing the steps of a method for printing and laminating a plot on a web of media, according to an embodiment of the invention.

In FIG. 1, a printing apparatus according to an embodiment of the invention comprises a printing device 1 and a laminating device 2, which are integrated in a single apparatus such as to provide printing and lamination of a web of media M, for example paper.

In the present specification and claims by 'integrated' apparatus and operation it is meant that the printing and laminating devices may operate in succession, a media being able to travel from one device to the other, such that the media may be printed and thereafter laminated by the apparatus in a continuous operation, without normally requiring manual intervention.

The printing and laminating devices 1,2 are arranged in the apparatus of FIG. 1 in such a way that, in normal operation, a web of print media M extends between the two devices, and may travel in a first advance direction shown by arrow A and also in the opposite direction, shown by arrow B, which will be referred to in the following as second advance direction.

In normal operation, in a first operation the media travels in said first advance direction A, and one or several plots are printed in the printing device 1, and then, in a second operation, the media advance direction is reversed and the printed plot or plots are laminated in the laminating device 2 while the media advances in the second advance direction B and is thus drawn back towards the printing device. If necessary, at the end of the laminating operation the media is advanced again in the first direction A until it is in the right position for continuing the printing operation on blank media.

The printing device 1 is in this example an inkjet printer, which comprises a printhead 10, a media driving roller 11, and a first media supporting roller 12; a reel of print media is loaded on this roller 12 and during the printing step the media is fed towards the printhead 10 in said first advance direction A.

The laminating device 2 comprises in this example a laminating nip 20, a pair of drive rollers 21, a second media supporting roller 22 and a pair of film feed rollers 23 for feeding appropriate laminating film F to the laminating nip 20.

The laminating device 2 is arranged such that a lamination step may take place when the media M is fed from the second supporting roller 22 and it travels in said second advance direction B: the media is pulled by the drive rollers 21 through the laminating nip 20, which comprises two laminating rollers that cooperate for applying heat and pressure to the media in order to laminate it together with one or two laminating films F.

The first media supporting roller 12 in the printing apparatus 1 is provided with first roller driving means (not shown); for example, roller 12 may be motorised.

This roller driving means are provided in order to take up the media on the first media supporting roller 12, i.e. the roller on the printer's side, when the media travels in the second advance direction B; such driving means normally are not provided associated to the feed roller of a printing device.

Similarly, the second media supporting roller 22 in the laminating device 2 is provided with second roller driving means (not shown) for taking up the media on said roller when the media travels in the first advance direction A.

It has to be noted that conventional laminating devices are generally provided with a motorised take-up roller, but the arrangement of such a roller is different from that of the laminating device 2: for example, in stand-alone laminators the motorised roller is arranged downstream of the laminating nip in the direction of advance of the media during lamination, while in this case the motorised roller is arranged upstream of the laminating nip 20 in said direction, i.e. in the second media advance direction B.

Roller 22 may also be provided with a brake or tensioning system (not shown) in order to exert a back tension on the web of media during the laminating step, when media is fed from this roller 22. The back tension contributes to avoid skew and thus reduces the need for resetting and alignment operations and down times and may also reduce media cockle and improve the finished product.

The media supporting rollers 12 and 22, and also the corresponding roller driving means, may be integrated in the printing and laminating devices, or they can be separate components attached to said devices.

The laminating device 2 is also provided with means (not shown) for opening the laminating nip 20 and/or for cutting the laminating film F, with the purpose of inactivating lamination when necessary, such that the media M may travel through the laminator without being pressed or heated and without film being applied to it: this feature allows to advance printed media through the laminating device during the printing step, before the advance direction is reversed for performing the Laminating step.

The printing device 1 in its turn allows the passage of laminated media, such that during the laminating step the media may travel past the printing device towards the first media supporting roller 12.

It is pointed out that the apparatus of FIG. 1 has been shown with a printing device 1 and a laminating device 2 arranged next to each other, but in practice the layout of an apparatus according to the invention can be very different from this diagram; for example the printing and laminating devices could be arranged in a single housing and close to each other, and the apparatus may include other additional devices, such as dryers, loading or feeding devices and the like.

An embodiment of a method for printing and laminating media will be described in the following with reference to FIGS. 2 to 5. These figures show in plan view a very schematic embodiment of the apparatus, with the media supporting rollers 12 and 22 separate from the printing and laminating devices for the sake of clarity and for a better understanding of the method. The printing and laminating devices have been depicted in thicker lines when they are printing or laminating, respectively, and in thinner lines when they are inactive and just allow passage of media without performing operations on it.

Figure 2:
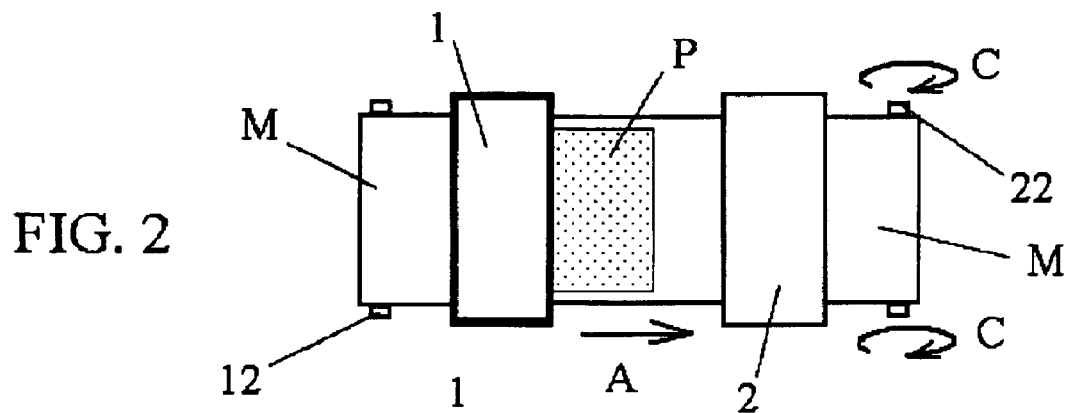

FIG. 2 illustrates a first step of the method, in which a plot P is being printed on a web of print media M in the printing device 1. The web of media is fed from the first media supporting roller 12 in the first advance direction A, travels through the printing device 1 and the laminating device 2, the latter being kept inactive, and is taken up on the second media supporting roller 22, which in this step is motorised, as shown by arrows C.

Figure 3:
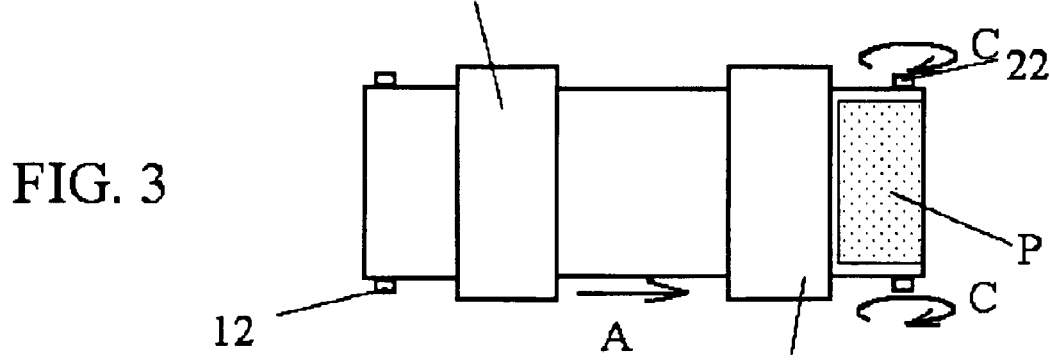

When the printing device 1 has finished printing the plot P, the media advance in the direction A continues until the plot P has travelled past the laminator device 2 (FIG. 3). Unless the plot P is very short, and depending on the geometry of the apparatus, most of the printed plot P will be wound on the second media supporting roller 22.

Figure 4:
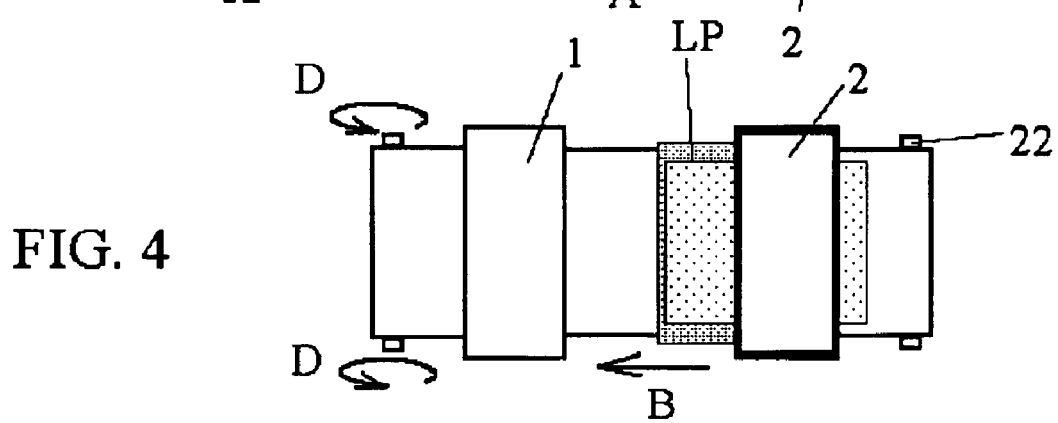

At this point, this second media supporting roller 22 is stopped, the laminating device 2 is activated and the media advance direction is reversed to direction B; the printed plot P travels back through the laminating device 2 where it is laminated, as shown in FIG. 4, and then through the printing device 1, while the media is wound back on the first media supporting roller 12, which is now motorised as shown by arrow D to take up media again. The laminated plot has been indicated with the reference LP.

Once the plot LP has travelled past the laminating device 2 and its lamination is completed, the film is cut, the laminating nip is opened to inactivate lamination, and advance of the media is stopped again.

At this point, depending on the length of the particular plot LP just laminated and the distance between the printing device and the laminating device, the plot LP may have reached the printing device 1 or even the first supporting roller 12 (long plots or very short distance between devices), or there may still be blank media between the laminated plot LP and the printing device (very short plots or large distance between devices).

Figure 5:
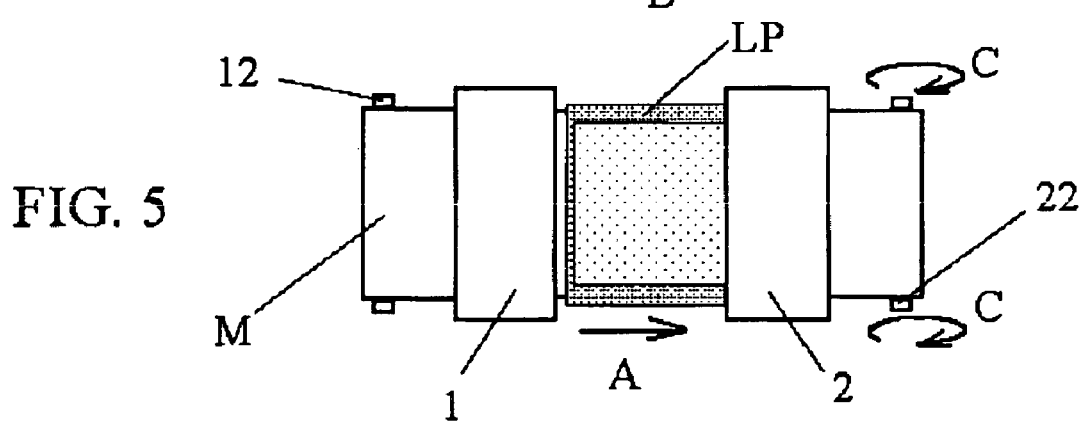

In the first and more common case, media is again advanced in the first media advance direction A, until the plot LP has travelled past the printing device 1 and the next blank portion of media is in position to be printed (FIG. 5).

In the second case, media would be advanced in the second media direction B until the blank media is taken up towards the printing device 1, such that no blank media is wasted.

If one plot printed on a web of media does not need to be laminated, the printing operation will simply continue to the next plot, without the need of reversing the advance direction; the plot that is not going to be laminated travels through the inactive laminator in direction A, while the next plot is being printed.

Another mode of operation could consist in first printing several consecutive plots, especially if they are relatively short plots, and then reversing the advance direction and laminating these plots before continuing printing the next plot or set of plots.

In case all the web of media has to be laminated, it is also possible to perform in the first place the printing operation on the whole web of media, advancing always in the first advance direction A and maintaining inactive the laminating device, and then reverse the direction of advance to direction B and laminate the whole web of media. In this case, at the end of the process the user would remove the printed and laminated web of media from the first media supporting roller 12.

A further possibility is to print all the media as described in the previous paragraph and subsequently advance the media in the direction B and cause all the web of media travel through the laminating device 2, but selectively opening the laminating nip 20 when a plot that needs no lamination travels therethrough.

It has to be noted that all the described operations may be performed without manual intervention, if the apparatus is provided with appropriate control means to control the operation of the printing and laminating devices, media rollers and other components, such that each plot is printed and laminated as required.

In this respect, a printing file associated to each plot to be printed may include a parameter to indicate if the plot requires lamination or not.

Some of the apparatus and methods described allow to print and laminate at least part of a web of media in an integrated and unattended operation, but avoiding some of the drawbacks that would arise in an arrangement in which the printing and laminating operations were performed one after the other in the same media advance direction.

The main advantages in this respect arise from the fact that it is not necessary to synchronise the two movements and to meet sometimes opposite requirements of the two operations.

For example, lamination of all the plots can be performed always in the same conditions regardless e.g. of the printing speed of each plot.

Another advantage is that media skew can be more easily controlled because a back tension can be applied during lamination without jeopardising the printing operation; this skew control also reduces the need of resetting the system frequently, and therefore improves the system throughput.

Furthermore, cockle reduction due to the fact that the media is wound on a roller between the printing and the laminating operations and due to the presence of back tension during lamination improves the quality of the laminated product.

What is claimed is:

1. A printing apparatus comprising a printing device for printing on print media and a laminating device for laminating at least part of said print media in an integrated operation, such that in normal operation the print media extends between the printing device and the laminating device, wherein said printing device comprises means for printing at least one plot on said media while it advances in a first media advance direction, and said laminating device comprises means for laminating at least one printed plot in a second advance direction of said print media which is opposite to said first advance direction.

2. An apparatus as claimed in claim 1, wherein said laminating device comprises means for selectively inactivating lamination when print media travels therethrough.

3. An apparatus as claimed in claim 1, comprising a first media supporting roller arranged upstream of the printing device in said first media advance direction and first roller driving means for taking up media on said first media supporting roller, said first roller driving means being releasable such as to allow media to be fed from said first media supporting roller.

4. An apparatus as claimed in claim 3, wherein said first media supporting roller is a media feed roller of said printing device.

5. An apparatus as claimed in claim 1, comprising a second media supporting roller arranged downstream of the laminating device in said first media advance direction and second roller driving means for taking up media on said second media supporting roller, said second roller driving means being releasable such as to allow media to be fed from said second media supporting roller.

6. An apparatus as claimed in claim 5, wherein said second media supporting roller comprises braking means for tensioning the media being fed from said second media supporting roller.

7. An apparatus as claimed in claim 5, wherein said second media supporting roller is associated to said laminating device.

8. A method for printing and laminating at least part of a print media in an integrated operation, such that in normal operation the print media extends between a printing device and a laminating device, wherein printing of at least one plot is performed in a first advance direction of said print media and subsequent laminating of at least one printed plot is performed in a second advance direction of said print media, which is opposite to said first advance direction.

9. A method as claimed in claim 8, comprising the steps of:
   advancing print media through said printing device in said first advance direction while printing at least one plot on said print media;
   further advancing the print media in said first advance direction until said at least one plot travels past said laminating device, while maintaining said laminating device inactive; and
   reversing the media advance direction and rewind the media towards the printing device in said second advance direction opposite to said first advance direction, while laminating at least one printed plot in said laminating device.

10. A method as claimed in claim 9, comprising the further step of advancing the print media in said first advance direction at least until all the laminated media has travelled past the printing device, while maintaining the laminating device inactive.

11. A method for printing and laminating at least part of a print media, comprising the steps of:
   advancing print media through a printing device in a first advance direction, and printing at least one plot on said print media;
   advancing the print media leaving the printer through a laminating device in said first advance direction, until said at least one plot travels past the laminating device, while maintaining said laminating device inactive;
   reversing the media advance direction and rewind the media towards the printing device in a second advance direction opposite to said first advance direction, while laminating at least one printed plot in said laminating device; and
   reversing again the media advance direction to advance laminated media in said first advance direction through the printing and laminating devices until all the laminated media has travelled past the printing device, while maintaining the laminating device inactive.

12. A method for printing and laminating at least part of a web of print media, comprising the steps of:
   advancing the web of print media trough a printing device and a laminating device in a first advance direction, while printing on said print media and maintaining said laminating device inactive, until substantially all the web has travelled past the laminating device;
   reversing the media advance direction and rewind the web of media towards the printing device in a second advance direction opposite to said first advance direction, while laminating at least part of said web of media in said laminating device, until substantially all the web of media has travelled back past the printing device.

* * * * *

UNITED STATES PATENT AND TRADEMARK OFFICE
CERTIFICATE OF CORRECTION

PATENT NO. : 6,908,192 B2  Page 1 of 1
APPLICATION NO. : 10/629413
DATED : June 21, 2005
INVENTOR(S) : Jordi Sender et al.

It is certified that error appears in the above-identified patent and that said Letters Patent is hereby corrected as shown below:

Column 3, Line 6, delete "white" and insert therefor --while--

Column 3, Line 38, delete "d" and insert therefor --of--

Column 3, Line 56, delete "non limiting" and insert therefor --non-limiting--

IN THE CLAIMS

Column 8, Line 42, delete "trough" and insert therefor --through--

Signed and Sealed this

Thirteenth Day of May, 2008

JON W. DUDAS
*Director of the United States Patent and Trademark Office*